United States Patent [19]

Bacher

[11] 4,278,300
[45] Jul. 14, 1981

[54] HYDRAULIC BRAKING CIRCUIT FOR AN AUTOMOBILE VEHICLE

[75] Inventor: Michel Bacher, Garges-les-Gonesse, France

[73] Assignee: Societe Anonyme Francaise du Ferodo, France

[21] Appl. No.: 58,255

[22] Filed: Jul. 17, 1979

[30] Foreign Application Priority Data

Jul. 24, 1978 [FR] France ................................ 78 21817

[51] Int. Cl.³ ........................... B60T 8/02; B60T 11/28
[52] U.S. Cl. ..................................... 303/115; 303/116
[58] Field of Search .............. 303/119, 116, 115, 117, 303/118, 68, 61, 69, 10; 188/181 A

[56] References Cited

U.S. PATENT DOCUMENTS

| | | | |
|---|---|---|---|
| 3,549,212 | 12/1970 | Leiber | 303/119 |
| 3,639,009 | 2/1972 | Klein et al. | 303/119 |
| 3,847,449 | 11/1974 | Adahan | 303/116 |
| 4,033,637 | 7/1977 | Leiber | 303/10 X |
| 4,155,604 | 5/1979 | Fenart | 303/119 |

FOREIGN PATENT DOCUMENTS 1561760 3/1969 France .
2350992 12/1977 France .

Primary Examiner—Douglas C. Butler
Attorney, Agent, or Firm—Charles E. Brown

[57] ABSTRACT

The invention comprises an anti-lock braking circuit of the kind which incorporates a modulation device between the master cylinder and the slave sylinder of the respective wheel. The modulation device is controlled by a pickup sensitive to wheel locking and comprises an isolation valve which in its normally open position establishes communication between the master cylinder and the slave cylinder, and a pressure drop regulation valve which can establish communication between the slave cylinder and a discharge. When locking of a wheel is sensed by the pickup, the isolation valve is closed and the pressure drop regulation valve is opened to connect the slave cylinder to the discharge, thereby reducing the braking force applied to the respective wheel. According to the invention, the modulation device incorporates a high-pressure accumulator and a pump for pressurizing the accumulator, and a non-return valve is provided to prevent fluid flow from the modulation device to the master cylinder, whereby during intervention of the modulation device the necessary fluid pressure for the slave cylinder is provided by the accumulator and the master cylinder is isolated from the modulation device so that undesirable variations in pressure on the brake pedal are avoided.

11 Claims, 3 Drawing Figures

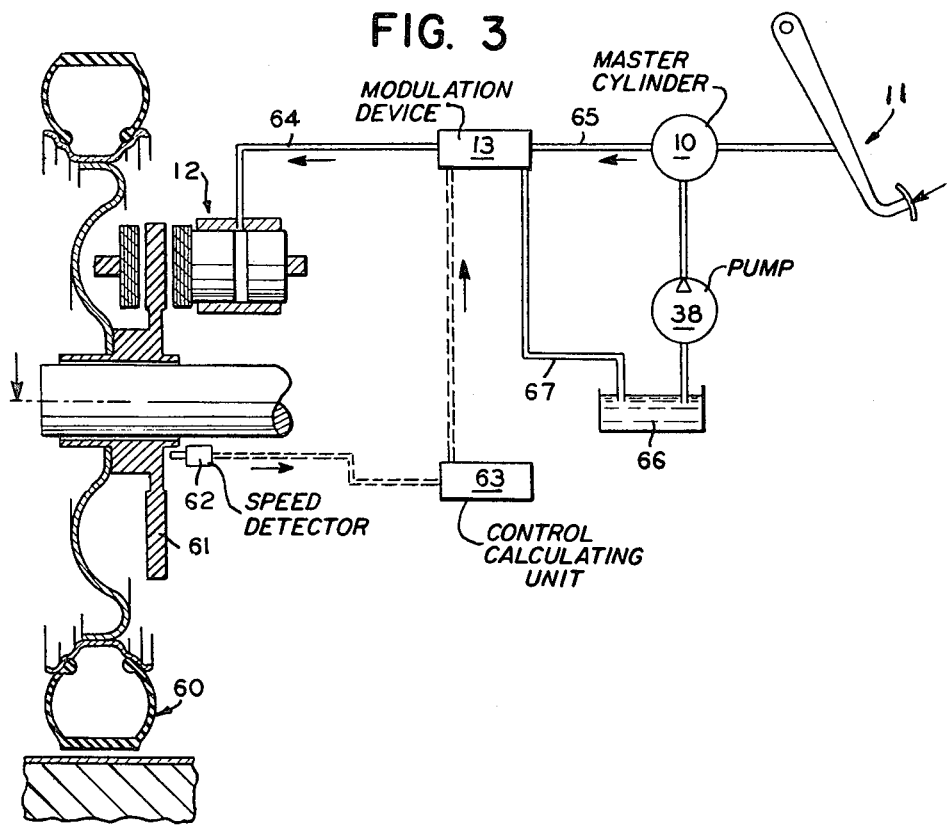

HYDRAULIC BRAKING CIRCUIT FOR AN AUTOMOBILE VEHICLE

BACKGROUND OF THE INVENTION

This invention relates generally to hydraulic braking circuits for automobile vehicles, which comprise a modulation device disposed between on the one hand a transmitter device such as a hydraulic master cylinder adapted to supply fluid under pressure under the control of an operating means, (which in practice is a brake pedal), and on the other hand the braking receiver such as a slave cylinder of a wheel brake, the modulation device being controlled by a pickup sensitive to the speed of rotation of the respective wheel and which comprises at least two valves, namely an isolation valve which when open is adapted to establish communication between the transmitter device and the braking receiver, and a pressure drop regulation valve which when open is adapted to establish communication between the braking receiver and a discharge.

A braking circuit of this kind is described in the French patent filed under No. 76 14030 and published under No. 2,350,992. As a matter of public information only, it is to be noted that U.S. Pat. No. 4,155,604 granted to Fenart on May 22, 1979, claims priority from the French Patent Application No. 76 14030.

During normal braking, that is to say braking which is sufficiently moderate for there to be no risk of the locking of a wheel, the isolating valve is open and the pressure drop regulation valve closed; there is direct communication through the isolating valve between the transmitter device and the braking receiver.

When in the course of braking a risk of locking arises, the pickup sensitive to the speed of the respective wheel comes into action and brings about on the one hand the closing of the isolating valve, thereby immediately interrupting all direct communication between the transmitter device and the braking receiver, and on the other hand the opening of the pressure drop regulation valve, thereby connecting the braking receiver in a regulated manner to the discharge.

When the risk of the locking of a wheel is eliminated on the discharge of the braking receiver in this manner, the pickup sensitive to the speed of the wheel ceases to act, thereby on the one hand bringing about the closing of the pressure drop regulation valve and on the other hand opening a third valve known as the pressure rise regulation valve, which was closed during the preceding phase and which, once opened, (and as long as the driver of the vehicle maintains his action on the brake pedal) brings about a regulated rise of pressure in the braking receiver, the isolating valve remaining at least temporarily closed.

If critical conditions liable to lead to the locking of a wheel should then occur again, the modulation device will once more intervene in accordance with a pressure drop and pressure rise cycle of the type briefly analysed above.

In practice, and where the drive of the vehicle continues to operate the brake pedal, a succession of such cycles will occur.

Each cycle corresponds to a variation of the pressure in the entire brake circuit, and particularly between the braking receiver and the transmitter device.

When this transmitter device is a proportioner, that is to say an assembly composed of a high pressure accumulator and a pump feeding the accumulator, the downstream pressure being modulated under the control of the brake pedal, as described more particularly in the previously mentioned French patent, such a variation of pressure does not give rise to any major mechanical inconvenience; however, when it is transmitted to the brake pedal it may constitute a nuisance to the driver of the vehicle.

When the transmitter device is a master cylinder, this nuisance is accentuated.

Furthermore, this master cylinder receives directly the variation of pressure due to the cycle of intervention of the modulation device, to the detriment of its working life.

The main object of the present invention is to reduce or eliminate these disadvantages.

SUMMARY

The invention proposes to isolate the transmitter device from the modulation device during intervention of the modulation device and to replace the transmitter device, for the supply of fluid under pressure to the braking receiver, by a high pressure accumulator with which is associated a pump adapted to place it under load.

It is true that French Pat. No. 1,561,760 proposes to replace a master cylinder by a high pressure accumulator served by a pump, in order to prevent the master cylinder from progressively emptying into the braking receiver when the brakes are applied.

However, unlike the brake circuit according to the invention, no particular arrangement is made for isolating the transmitter device from the modulation device, which is moreover of the slide valve type and not of the clack valve type.

More precisely, the object of the present invention is to provide a hydraulic brake circuit for an automobile vehicle, of the kind comprising, disposed between a transmitter device and the braking receiver of a wheel brake, a modulation device which is controlled by a pickup sensitive to the speed of rotation of the respective wheel and which comprises at least two valves, namely an isolation valve which when open is adapted to establish communication between the transmitter device and the braking receiver, and a pressure drop regulation valve which when open is adapted to establish communication between the braking receiver and a discharge, in cooperation with a high pressure accumulator adapted to replace the transmitter device for supplying the braking receiver and with a pump adapted to place the said pressure accumulator under load, this brake circuit being characterised in that between the modulation device and the transmitter device a non-return valve is disposed which is adapted to isolate the transmitter device from the modulation device in the direction of fluid flow from the modulation device to the transmitter device.

The variations of pressure originating from the modulation device during its intervention thus have no effect on the transmitter device.

BRIEF DESCRIPTION OF THE DRAWINGS

FIG. 3 is a further block diagram showing more specifically the environment of the brake circuits of FIGS. 1 and 2 in a motor vehicle braking circuit.

DESCRIPTION OF THE PREFERRED EMBODIMENTS

Figure 1:
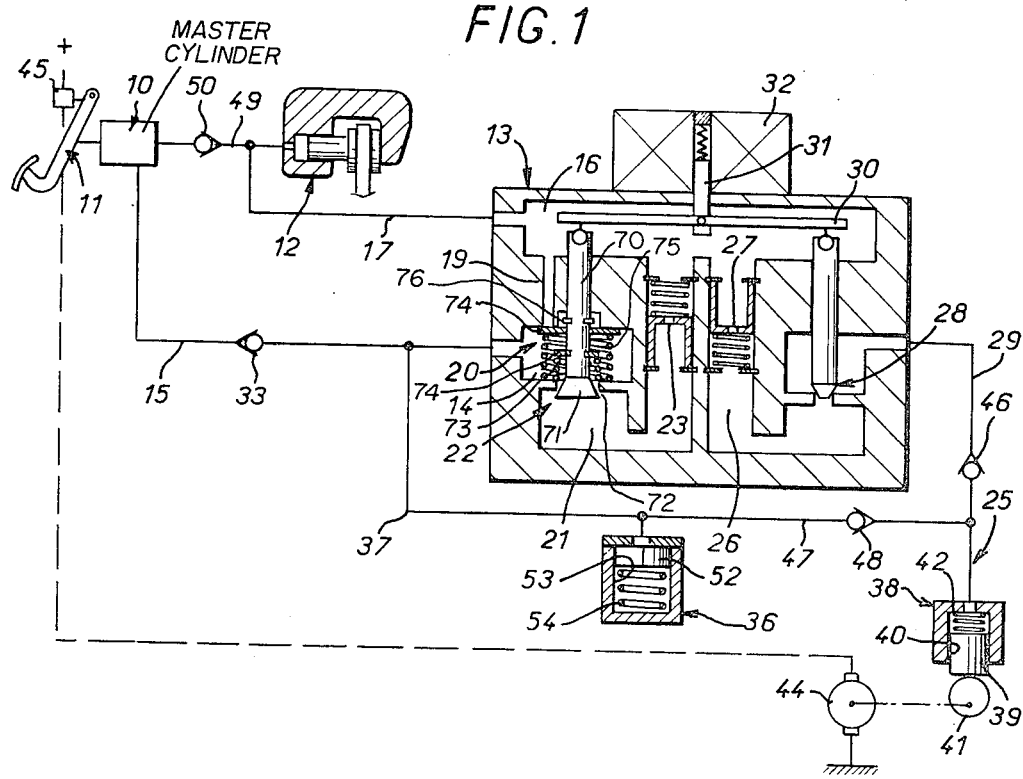
FIG. 1 is a block diagram of a hydraulic brake circuit according to the invention.

In the drawings can be seen a hydraulic brake circuit of the kind similar to that described in French Pat. No. 76 14030 mentioned above; between a master cylinder or transmitter device 10 controlled by an operating means at the disposal of the user, which in practice is a brake pedal 11, and the braking receiver 12 of a wheel brake on the other hand, is interposed a pressure modulation device 13.

In practice, as in the example illustrated, the transmitter device 10 is a master cylinder and will be so referred to hereinbelow. The receiver 12 is usually a slave cylinder.

The modulation device 13 will be only briefly described here: it comprises a first chamber 14 connected by a pipe 15 to the master cylinder 10, and a second chamber 16 connected by a pipe 17 to the braking receiver 12; the first chamber 14 is connected to the second chamber 16 on the one hand by a first channel 19 controlled by a spring loaded valve 20, hereinafter referred to as an isolation valve, and on the other hand by a second channel 21 controlled by a valve 22, hereinafter referred to as a pressure rise regulation valve, the said second channel 21 also including a calibrated nozzle 23; the second chamber 16 is in communication with the discharge side 25 of the system via, in succession, a third channel 26 which contains a calibrated nozzle 27 and a valve 28, hereinafter referred to as a pressure drop regulation valve, and a pipe 29; finally, the regulation valves 22 and 28 are coupled to opposite ends of a rocker 30 pivotally fastened to a plunger core 31 of a solenoid 32, the operation of which is under the control of a pickup sensitive to the speed of the wheel concerned through the braking receiver 12 as will be described in more detail hereinafter.

As is more fully described and illustrated in the aforementioned French Pat. No. 2,350,992, the valve 22 includes an elongated stem 70 which has the upper end thereof connected to the rocker 30. The stem 70 carries at its lower end a frustoconical valve head 71 which is seatable on a valve seat 72 for closing flow from the first chamber 14 into the channel 21. The valve 22 is urged towards a closed position by a valve spring 73 which bears upwardly against a collar 74 carried by the valve stem 70.

The valve 20 includes a valve disk 74 which is slidably mounted on the stem 70 and is normally urged to a position closing the channel 19 by a valve spring 75. The valve stem 70 carries a collar 76 which is engageable with the valve disk 74 to urge it to an open position when the valve stem 70 moves downwardly.

According to the invention a non-return valve 33 adapted to isolate the master cylinder from the modulation device 13, in the direction of flow of fluid from the modulation device 13 to the master cylinder 10, is disposed between the modulation device 13 and the master cylinder 10.

A high pressure accumulator 36 is provided for replacing the master cylinder 10 in the provision of fluid under pressure to the modulation device 13 and, through the latter, to the braking receiver 12.

Through a pipe 37 this high pressure accumulator 36 is connected to the pipe 15 between the non-return valve 33 and the modulation device 13, and a pump 38 is provided for pressurizing the accumulator.

According to one aspect of the invention, this pump 38 is fitted in the discharge 25.

The general environment of the invention, as is more specifically described in French Pat. No. 2,350,992, is generally shown in FIG. 3. It will be seen that there is illustrated a conventional vehicle wheel 60 which is to be engaged with a roadway and which wheel is carried by an axle which, in turn, carries a brake rotor 61. The brake rotor 61 has associated therewith the braking receiver 12 which carries the usual pads for clampingly engaging the rotor 61 to effect a resistance to the rotation of the wheel 60.

There is associated with the wheel 60 and the rotor 61 a conventional speed detector 62 which detects the rotational speed of the wheel 60 or the rotor 61. The speed detector 62 is coupled to a control calculating unit 63 which, in turn, is coupled to the modulating device to actuate the solenoid 32.

Figure 2:
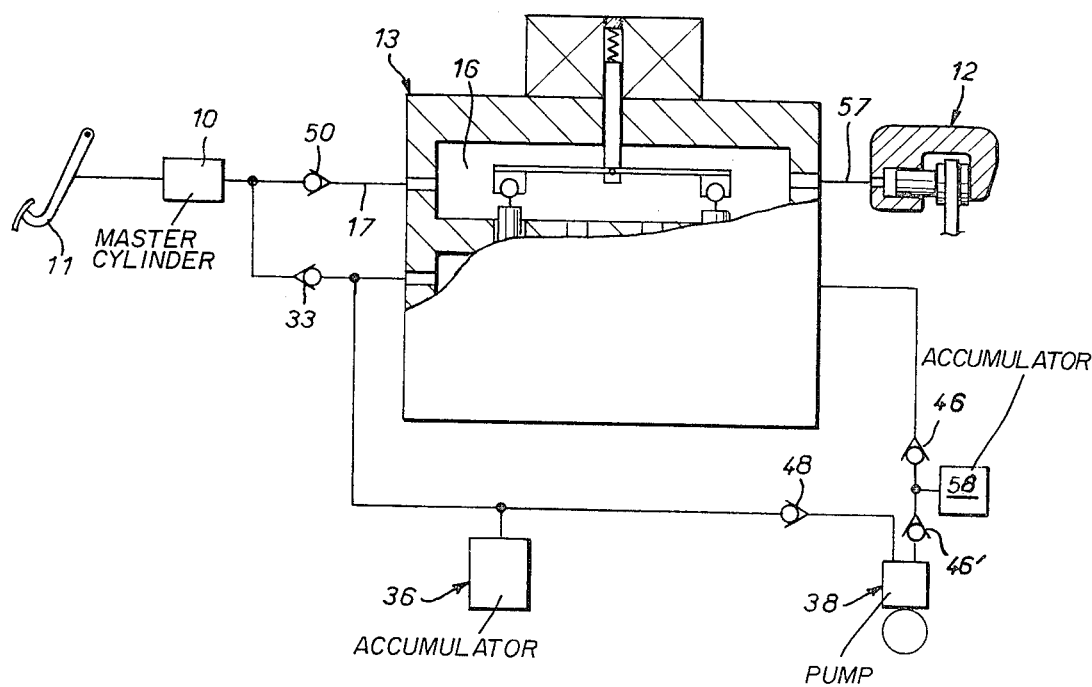
FIG. 2 is a view similar to FIG. 1 showing an alternative embodiment.

Inasmuch as the fluid circuitry of this figure is somewhat different from that of FIGS. 1 and 2, it is pointed out here that in the illustration of FIG. 3 the modulation device 13 is coupled to the braking receiver 12 by a fluid line 64. In a like manner, the modulation device 13 is coupled to the master cylinder 10 through a fluid line 65. There is also illustrated a reservoir 66 to which the pump 38 is coupled for pumping hydraulic fluid to the master cylinder 10. A return line 67 delivers returning fluid from the modulation device 13 to the reservoir 66.

When the footpedal 17 is moved in the direction of the arrow to actuate the master cylinder, hydraulic fluid flows to the braking receiver 12, but is controlled by the modulation device 13. In accordance with the detected speed and the signal from the control calculating unit, there is a controlled flow of the hydraulic fluid from the master cylinder through the modulation device to the braking receiver 12, thereby providing for a controlled actuation of the vehicle wheel brake.

In the example illustrated in FIG. 1 the pump itself constitutes this discharge and, in the case of a pump having a piston 39 mounted for movement in a cylinder 40 under the control of a cam 41, its cylinder capacity must be established in such a manner that during a single stroke it can absorb almost instantaneously the flow of fluid corresponding to the discharge of the braking receiver 12.

In order to accelerate its intervention the piston 39 of the pump 38 is preferably held in permanent contact with the cam 41 controlling it, this being achieved by means of a spring 42.

The pump 38 is thus able to develop a reduced pressure or suction relative to the modulation device 13, and therefore in relation to the flow of fluid which it has to absorb.

In the embodiment illustrated in FIG. 1, the cam 41 of the pump 38 is driven by an electric motor 44, controlled by the brake pedal 11, for example with the aid of the contact 45 usually operated by the pedal to illuminate the rear stop lights of the vehicle, as illustrated in broken lines in FIG. 1.

The pump 38 is thus operated each time the brakes are applied, even if this braking does not call for the intervention of the modulation device 13, thus avoiding its seizing in the intervals between such interventions.

On the pipe 29 connecting the modulation device 13 to the discharge, which in this case is the pump 38, is interposed a non-return valve 46 adapted to prevent any circulation of fluid in the discharge direction, which in practice is the direction of flow from the pump 38 to the modulation device 13, and on the pipe 47 connecting the pump 38 to the high pressure accumulator 36 there is likewise interposed a non-return valve 48 preventing circulation of fluid in the direction of flow from the high pressure accumulator 36 to the pump 38.

Finally, the master cylinder 10 is directly connected to the braking receiver 12 through a pipe 49 in which is interposed a non-return valve 50 preventing circulation of fluid directly from the master cylinder 10 to the braking receiver 12; the pipe 17 is connected between the non-return valve 50 and the braking receiver 12.

In a manner known per se the high pressure acumulator 36 is of the type comprising a piston 52 mounted sealingly for movement in a cylinder 53 against the action of a spring 54.

This spring 54 is calibrated at a value such that the pressure in the high pressure accumulator 36, as soon as the latter is under load, is higher than the pressure required to lock the wheel concerned on a road surface assumed to be providing the best possible braking conditions.

In practice the calibration of the spring 54 is such that the pressure in the high pressure accumulator is e.g. at least 150 bars.

It will first be assumed hereinbelow that the conditions are such that no risk of the locking of a wheel is likely to occur.

The solenoid 32 of the modulation device 13 is therefore not receiving current, the isolation valve 20 is in the open position, and the same is true of the pressure rise regulation valve 22, while the pressure drop regulation valve 28 is closed.

When the brakes are applied, the fluid delivered by the master cylinder 10 under the action of the pedal 11 passes through the modulation device 13 before reaching the braking receiver 12, passing in succession through the pipe 15, the first channel 19 of the modulation device 13, and the pipe 17.

When the action on the brake pedal 11 ceases, the fluid flows back directly from the braking receiver 12 to the master cylinder 10 by way of the pipe 49, the nonreturn valve 50 interposed on the latter being designed to open without delay for this direction of circulation of the fluid, without giving rise to any residual pressure on the braking receiver side, and thus to avoid abnormal wear on the brake linings.

When the brakes are thus applied under normal conditions, the pressure drop regulation valve being closed, the pump 38 works without load and the high pressure accumulator 36 is discharged.

It will now be assumed that the braking conditions are such that there is a risk of the locking of the wheels.

The speed pickup controlling the solenoid 32 causes the latter to come into action; the isolation valve 20 and the pressure rise regulation valve 22 close, while the pressure drop regulation valve 28 opens.

All communication between the master cylinder 10 and the braking receiver 12 is interrupted, and the receiver 12 is brought into communication with the discharge 25 by the way of the pipe 17, the second chamber 16 of the modulation device 13, and the third channel 26 of the latter; at least a part of the fluid present in the braking receiver 12 flows back in the direction of the discharge.

The fluid thus directed towards the discharge 25 is immediately taken by the pump 38 and delivered by the latter to the high pressure accumulator 36, which is thus progressively placed under load.

Because of the special calibration of the spring 54 of the high pressure accumulator 36, as indicated above, the pressure downstream of the non-return valve 33 is always higher than the pressure upstream of the non-return valve 33, so that the latter remains closed in all circumstances and the master cylinder 10 is thus isolated from the modulation device 13.

When the critical conditions which led to the operation of the solenoid 32 have ceased to exist, the feeding of the latter is interrupted, so that the pressure rise regulation valve 22 opens and the pressure drop regulation valve 28 closes, while the isolation valve 20 remains at least momentarily in the closed position.

Through the pipe 37, the chamber 14 of the modulation device 13, the second channel 21 of the latter, its chamber 16, and the pipe 17, the high pressure accumulator 36 then again supplies fluid under pressure to the braking receiver 12, replacing the master cylinder 10 for that purpose, the master cylinder remaining isolated from the modulation device 13 by the non-return valve 33.

If critical braking conditions occur once more, the solenoid 32 will intervene again, and the operations described above are repeated cyclically.

However, because of the non-return valve 33 the master cylinder 10 is not subjected to the corresponding variations of pressure in the pipe 37.

If in the course of any of the cycles of intervention of the modulation device 13 the action on the pedal 11 ceases, either nothing will happen because the pressure in the braking receiver is zero as the result of such an intervention, or else, this pressure not being zero, the braking receiver 12 discharges normally into the master cylinder 10 by way of the non-return valve 50.

In either of these cases, the reaction of the brake circuit of the invention is sound, the release of the brake pedal 11 quite obviously indicating that no additional braking action is desired by the driver of the vehicle, at least momentarily.

As will be observed, the rise in pressure of the braking receiver 12 is effected from a high pressure which advantageously is constant, namely the pressure defined by the calibration of the high pressure accumulator 36, irrespective of the greater or lower intensity of the action of the driver of the vehicle concerned on the brake pedal 11.

The conditions under which this rise in pressure takes place are thus improved.

Like the non-return valve 50, the non-return valve 46 is preferably designed to have no residual pressure, that is to say to open without delay when a difference in pressure occurs at its boundaries, in order that the drop in pressure in the braking receiver 12 may occur without delay when that is necessary.

The suction action developed by the pump 38 because of the action of the spring 42 is advantageously favourable in this respect.

In the alternative embodiment illustrated in FIG. 2 the discharge 25 comprises not only the pump 38 but also a low pressure accumulator 58; as an example, and as illustrated, this accumulator is connected to the pipe 29 between the non-return valve 46 and a non-return valve 46'; as an alternative it is simply connected between the modulation device 13 and the non-return valve 46.

The cylinder capacity of the pump 38 can thus advantageously be reduced, which is favourable to a reduction of its cost.

Furthermore, in this embodiment the supply connection between the master cylinder 10 and the braking receiver 12 is made by way of the second chamber 16 of the modulation device 13, the master cylinder 10 being connected to the said chamber by a pipe 17 controlled by a non-return valve 50, as previously, while the connection of the braking receiver 12 to the chamber 16 in question is made by means of a pipe 57 separate from the previously mentioned pipe.

The present invention is obviously not limited to the embodiments described and illustrated, but includes any modified embodiments and/or combinations of their various elements.

In particular, the pump 38 may be permanently driven by the engine of the vehicle or by the shaft of the wheel with which the braking receiver in question is associated.

Moreover, the field of application of the invention is not limited to cases where the transmitter device adapted to deliver fluid under pressure is a master cylinder, but obviously also extends to cases where it is a proportioner.

I claim:

1. A hydraulic braking circuit for a motor vehicle, said braking circuit comprising a transmitter device for transmitting brake fluid under pressure to a wheel cylinder for a wheel brake, a modulation device controlled by a pickup sensitive to the speed of rotation of the associated wheel, said modulation device comprising at least two valves including an isolation valve for normally establishing communication between said transmitter device and said wheel cylinder and a pressure drop regulation valve which when open establishes communication between said wheel cylinder and discharge means of said circuit, said discharge means in cooperation with a high pressure accumulator being operable to replace said transmitter device for transmitting fluid under pressure to said wheel cylinder during the operating cycle of said modulation device, and pump means associated with said discharge means for pumping brake fluid to said high pressure accumulator, the improvement comprising a nonreturn valve disposed between said transmitter device and said modulation device for isolating said transmitter device from said modulation device and said high pressure accumulator in the course of the operating cycle of said modulation device.

2. A braking circuit according to claim 1, together with an electric motor for driving said pump means, and brake pedal controlled switch means for actuating said electric motor.

3. A braking circuit according to claim 1, further comprising a second nonreturn valve interposed in a line directly connecting said transmitter device to said wheel cylinder for preventing transmission of fluid directly from said transmitter device to said wheel cylinder, said second nonreturn valve permitting return flow of fluid from said wheel cylinder to said transmitter device.

4. A braking circuit according to claim 3, said second nonreturn valve having no residual pressure.

5. A braking circuit according to claim 1, further comprising another nonreturn valve interposed between said modulation device and said discharge means for preventing the flow of fluid from said discharge means to said modulation device.

6. A braking circuit according to claim 5, said another nonreturn valve having no residual pressure.

7. A braking circuit according to claim 1, wherein said high pressure accumulator includes a piston movably mounted in a cylinder, a spring normally urging said piston against displacement, said spring applying a load to said piston such that the fluid pressure in said accumulator is higher than the maximum pressure to be transmitted by said transmitter device to said wheel cylinder.

8. A braking circuit according to claim 1, wherein said pressure drop regulation valve is normally closed so that no fluid passes from said modulation device to said discharge means in the course of normal operation.

9. A braking circuit according to claim 1, wherein said pressure accumulator is connected to said modulation device downstream of said nonreturn valve for isolating said transmitter device from said modulation device during the operating cycle of said modulation device, whereby fluid from said high pressure accumulator is discharged towards said modulation device once said isolating valve reopens.

10. A braking circuit according to claim 1, wherein said pump means is disposed directly downstream of said discharge means relative to the flow of fluid out of said modulation device during the operating cycle thereof so that the fluid discharged from said modulation device is pumped to said pressure accumulator.

11. A braking circuit according to claim 1, wherein said transmitter device is a master cylinder.

* * * * *